Feb. 25, 1941.    A. BURGENI    2,233,301

FASTENING OR COUPLING ELEMENT FOR USE IN SEPARABLE FASTENERS

Filed Oct. 20, 1938

Alfred Burgeni  INVENTOR

BY
Gifford, Scull & Burgess
ATTORNEYS.

Patented Feb. 25, 1941

2,233,305

UNITED STATES PATENT OFFICE 2,233,305

FASTENING OR COUPLING ELEMENT FOR USE IN SEPARABLE FASTENERS

Alfred Burgeni, East Orange, N. J., assignor to Crown Fastener Corporation, Warren, R. I., a corporation of Delaware Application October 20, 1938, Serial No. 235,949

6 Claims. (Cl. 24—205)

This invention relates to a novel and improved form of fastening or coupling element, more particularly a thermoplastic element which provides an increased resistance against the distorting effect of heat or swelling, or the combined effect of heat and swelling. It has been observed, for instance, that separable fasteners made of cellulose acetate cannot be laundered with soap and water at elevated temperatures without damaging or even completely offsetting their action. This effect is due to a severe and permanent distortion of the coupling elements when subjected to the combined influence of heat and swelling.

In the accompanying drawing, in which I have illustrated one embodiment of the invention:

Figure 1:
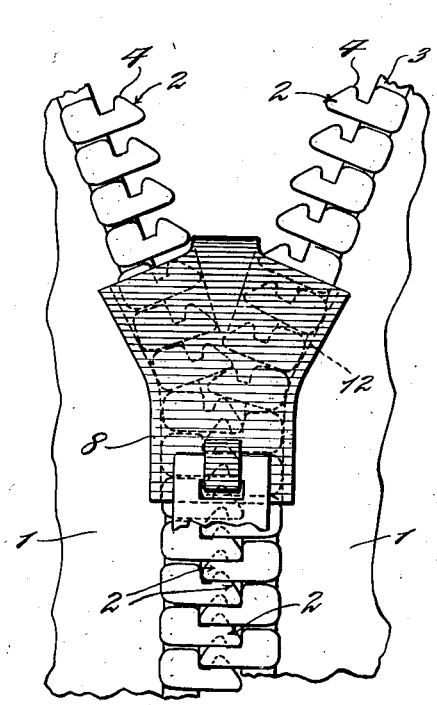
Fig. 1 is a fragmentary view of a separable fastener of the type covered by this application.
Figure 2:
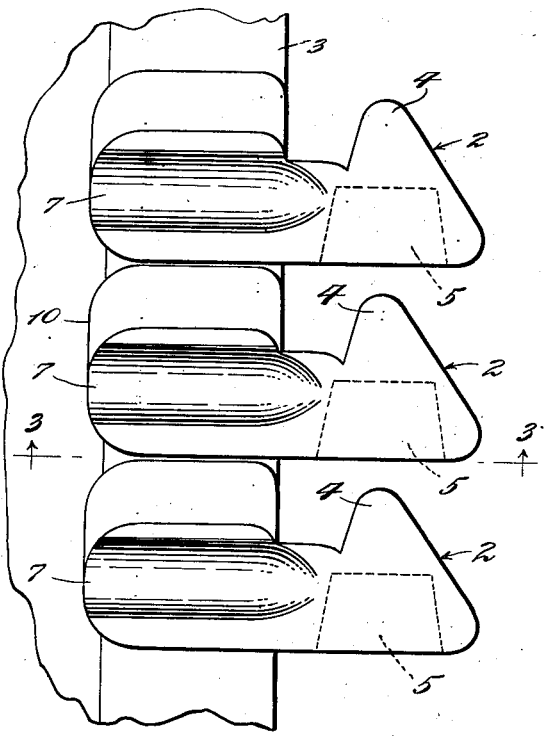
Fig. 2 is an elevation of part of one of the stringers appearing in Fig. 1.

As known, separable fasteners of this type comprise stringers 1 on which are mounted closely spaced fastening or coupling elements 2, these usually being secured to the stringers by engaging a bead 3 on a stringer. The elements may be secured to the bead by die-casting in place or any other suitable manner. The fastening elements are normally formed with projections 4 on the tops thereof and with corresponding mating recesses 5 on the bottoms thereof. The specific form of the projections and recesses may vary.

To avoid the binding action which occurs when thermoplastic fasteners are laundered, I have provided the opposite sides of the bodies of all of the elements with recesses 7. The sides 6, of course, are the sides which face the opposite walls of the slider 8, the inner surfaces of said walls being indicated at 9 in Fig. 4. The bodies of the elements may be of one material throughout, as shown in the drawing, or may have metallic cores, as shown for example in the patent to Kelley 2,075,762, but in either case they have outer surfaces which are adjacent the walls of the slider, as noted above. The slider may be of any usual or suitable form and a more or less conventional type of slider has been illustrated herein. The function of this slider is to open or close the fastener, as is well known in the art. By providing the recesses 7, which may be cylindrical and extend lengthwise of the elements, I have found that the detrimental effects referred to above are substantially avoided.

The plane surfaces of thermoplastic objects assume a curved shape of more or less convex character when subjected to the influence of heat or swelling, or to the combined influence of both factors. The tendency of the surface tension of the material to produce bodies of globular shape is responsible for the described effect, and small or narrow objects of plastic materials show the most pronounced tendency to assume distorted shapes of the described type.

Surfaces 7 of the coupling elements are of particular interest in this regard because of their narrowness and their importance for a smooth action of the slider. A convex deformation of these surfaces results necessarily in insufficient clearance between the coupling members and the slider and is thus the cause for rough action and even complete failure of the fastening device.

According to the present invention, therefore, it is possible to reduce or completely eliminate the effect of heat distortion in a purely mechanical way by counteracting the tendency of the surface tension to produce convex deformations. This can be accomplished by providing the surfaces of the individual coupling elements with indentations or recesses, for example of a suitable concave curvature, as described above.

When the fastener is laundered, as noted above, a fastening element, at the surface of a recess, will tend to expand, and the amount of this expansion may be called the expansive distortion of that surface. The depth of each recess preferably is greater than the expansive distortion of the surface of that recess, or at least substantially as great as that distortion. By this construction the expansive distortion will not increase the total thickness of an element sufficiently to cause said element to bind against the guiding walls of the slider.

The introduction of concave-shaped surfaces 7 offsets successfully the tendency of the fastener elements to assume a convex shape and to increase in thickness in the direction perpendicular to the mounting tape. This fact may be illustrated by an example.

Figure 4:
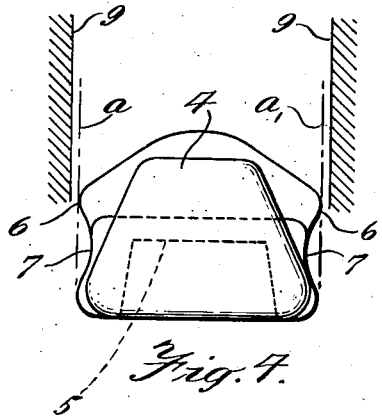
Fig. 4 is an end view of one of the elements shown in Fig. 2 as appearing from the right of that figure.
Figure 3:
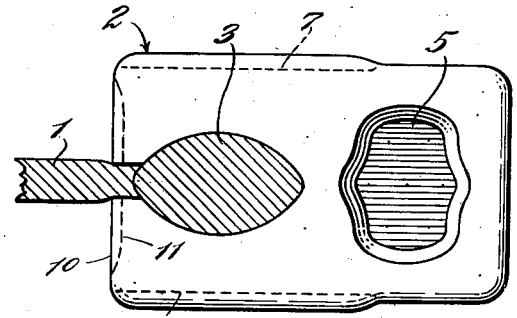
Fig. 3 is a view on the line 3—3 of Fig. 2.

Two groups of separable fasteners were prepared from a hard type of cellulose acetate by the process of injection molding. The coupling elements of the fasteners representing the first group had the well known plane shape known in the art. The thickness of the elements in the direction perpendicular to the mounting tape was 0.100″. The samples of the second group were molded under identical conditions as those of the first group except that the dies were provided with inserts for producing concave shaped surfaces 7, as it is shown in Figs. 3 and 4.

The fasteners of both groups were subjected for half an hour to laundering in 0.5% soap solution at 160°, 180°, 200°, and 212° F., respectively.

The table below shows the thickness of the coupling elements after laundering and drying. The data on concave elements of the table are strictly comparable with those obtained on plane ones, because the measurements were taken between the lines $a—a_1$ of Fig. 4, representing the maximal thickness of the coupling elements in the direction perpendicular to the mounting tape.

*Thickness of coupling elements in the direction perpendicular to the tape*

| Laundering temperature | Thickness of the members | |
|---|---|---|
|  | Plane | Concave |
|  | Inches | Inches |
| 160° F | 0.1014 | 0.1003 |
| 180° F | 0.1015 | 0.1004 |
| 200° F | 0.1017 | 0.1005 |
| 212° F | 0.1017 | 0.1005 |

The surfaces 7 of the original plane links which were adjacent the walls of the slider and which correspond generally to the sides 6 were badly deformed and showed a convex shape. The clearance between the stringers and sliders was insufficient due to the greatly increased thickness of the coupling links. This resulted in rough action and jamming of the fasteners making them unfit for further practical use. The fasteners made of concave links, in contrast, showed little signs of distortion and the clearance between stringers and sliders was sufficient to provide for perfectly smooth action. Repeated launderings showed continued satisfactory results, in that the concavity of the recesses was not greatly reduced. After several launderings, there was still a pronounced concavity and sufficient to offset the tendency to distortion.

The greatly reduced distortion of links, shaped according to the present invention, offers a number of further advantages of which the following may be described:

The new type of separable fasteners may be successfully combined with sliders made of inorganic substances such as metals, as well as organic substances such as thermo-setting plastics or thermoplastic resins of higher resistance than the material used for making the coupling elements. The application of form resistant materials for the production of sliders is highly desirable because the distortion of the sliders is frequently responsible for the failure of laundered separable fasteners.

Sliders of improved form resistance, on the other hand, show reduced or no tendency to adapt their aperture during heat treatment to the dimensions of the distorted coupling elements. Fasteners equipped with sliders made of a material of higher form resistance than the coupling elements, therefore, have an increased tendency to bind. Their action, after laundering, indeed is inferior to that of fasteners in which coupling links, as well as sliders, consist of one and the same material. For this reason it was found impractical, heretofore, to equip thermoplastic separable fasteners with sliders made of materials of higher form resistance than the coupling elements.

Sliders of improved or complete resistance, however, may be used successfully and without impairing the action of the fasteners after a heat treatment if the coupling elements are shaped according to the present invention. I have observed that sliders made of thermoplastic materials of considerably higher form resistance than the coupling elements may be used successfully and without necessitating any dimensional changes in the construction of these sliders. Separable fasteners, assembled in the described way may be laundered repeatedly and at high temperatures without showing signs of roughness or failure to close.

In using sliders made of materials of highest form resistance, such as various inorganic substances or thermosetting resins, I prefer to make the slider aperture just large enough to take into account the slight distortion of the concave coupling elements after laundering or other heat treatments. I have found that this may be safely done and without impairing the action of the separable fasteners prior to the heat treatment because the required adjustment of the dimensions is very small, as has been disclosed by the above table.

A further advantage of concave shaped surfaces 7 consists in an improved bond between the thermoplastic coupling elements and the stringers. This fact has been observed on separable fasteners produced by the die casting method.

The maximum load which a separable fastener is able to support in the direction parallel to the main axis of the coupling elements is usually determined by the bond between the coupling elements and the mounting tape. It can be measured by placing the two mounting strips of a closed fastener into the jaws of a strength testing machine and subjecting the test specimen to increasing stress until the load is reached where separation between coupling elements and mounting strips occurs. The improved bond between concave shaped coupling elements and mounting strips has been observed consistently on various types of plastics and may be demonstrated by an example:

Two types of cellulose acetate I and II of different hardness were used for producing separable fasteners by the process of injection molding. Plane, as well as concave coupling elements were produced from each of the respective cellulose acetate types. The strength of the closed fasteners were tested in a strength testing machine of the pendulum type. The table below gives the strength results in pounds per inch and demonstrates the superiority of the concave type of coupling elements.

|  | I | II |
|---|---|---|
| Plane | 54 | 62 |
| Concave | 61 | 75 |

A still further advantage of the present invention consists in an improved appearance of separable fasteners if prominent surfaces such as 7 of the coupling elements are given a concave, e. g., cylindrical curvature. The light reflection of concave surfaces takes place only in a small part of the total area while plane surfaces reflect the light from the entire area. Concave coupling members, as a result, appear to be less bulky than plane ones.

It will be understood that the present invention is not limited to any specific type of thermoplastic substances or to any special construction of coupling elements. Furthermore, it is not limited to special surfaces of these coupling elements nor to the definite geometrical shape of the concave curves. Any surface which may act as an obstruction due to deformation caused by heat, swelling, or a combined influence of both factors, may be treated according to the present invention and suitable concave curvatures may be given to the entire surface or to a part of it.

In practice, the sides 6 usually will be the surfaces that should be provided with the recesses, because of their narrowness, as measured in a direction lengthwise of the stringers. This narrowness, as pointed out above, results in a greater deformation than where the surface is wider. For example, there will be relatively little deformation of a surface 6 as measured in a direction lengthwise of one of the elements 2, and likewise, if the elements are wide enough as measured in a direction lengthwise of the stringers, then it may not be necessary to provide those surfaces with recesses. The narrower the surface, the greater is the deformation and the resulting need for the recess, and the deeper should be the recess.

While recesses have been shown in the surfaces 6, they may also be used to advantage in the free ends 10 of the bodies of the elements, as indicated at 11 in Fig. 3, to avoid binding against the flanges or walls 12 of the slider. These flanges, as known in the art, engage the ends 10 to aid in closing the fastener, and with the walls 9, form guiding walls for the elements.

No matter which surface is provided with the recess, that surface is preferably provided with a substantially continuous recess throughout that part of the surface which may come in contact with a wall of the slider. The tendency of the surface tension of the material to give the surface a globular shape naturally is less pronounced along the longest dimension of the surface and more pronounced along a short dimension of that surface. Therefore it is preferable to have the recesses extending lengthwise of any surface which may contact with a wall of the slider, because by so doing the most pronounced result of the swelling is avoided.

While I have shown the invention as embodied in a specific form, it is to be understood that various changes in details may be made without departing from the scope of the invention as defined by the appended claims.

I claim:

1. In a separable fastener of the type comprising a pair of stringers having fastening elements thereon and a slider constructed and arranged to slide over said elements in opposite directions to open and close the fastener and having guiding walls for said elements, said elements having bodies of thermoplastic material with outer surfaces of the same material facing said guiding walls of the slider, said surfaces having recesses therein extending lengthwise of said bodies substantially to the free ends thereof, for the purpose set forth.

2. In a separable fastener of the type comprising a pair of stringers having fastening elements thereon and a slider constructed and arranged to slide over said elements in opposite directions to open and close the fastener and having guiding walls for said elements, said elements having bodies of thermoplastic material with outer surfaces of the same material facing said guiding walls of the slider, said surfaces having cylindrical recesses therein extending lengthwise of said bodies substantially to the free ends thereof, for the purpose set forth.

3. An unlaundered separable fastener of the type comprising a pair of stringers having fastening elements thereon and a slider constructed and arranged to slide over said elements in opposite directions to open and close the fastener and having guiding walls for said elements, said elements having bodies of thermoplastic material with outer surfaces of the same material facing said guiding walls of the slider, said surfaces having therein recesses with continuous walls, the depth of a recess being at least substantially as great as the expansive distortion of the surface of said recess caused by laundering.

4. An unlaundered separable fastener of the type comprising a pair of stringers having fastening elements thereon and a slider constructed and arranged to slide over said elements in opposite directions to open and close the fastener and having guiding walls for said elements, said elements having bodies of thermoplastic material with outer surfaces of the same material facing said guiding walls of the slider, said surfaces having therein recesses with continuous walls, said recesses extending lengthwise of said bodies and the depth of a recess being at least substantially as great as the expansive distortion of the surface of said recess caused by laundering.

5. An unlaundered separable fastener of the type comprising a pair of stringers having fastening elements thereon and a slider constructed and arranged to slide over said elements in opposite directions to open and close the fastener and having guiding walls for said elements, said elements having bodies of thermoplastic material with outer surfaces of the same material facing said guiding walls of the slider, said surfaces having therein recesses with continuous cylindrical walls, the depth of a recess being at least substantially as great as the expansive distortion of the surface of said recess caused by laundering.

6. An unlaundered separable fastener of the type comprising a pair of stringers having fastening elements thereon and a slider constructed and arranged to slide over said elements in opposite directions to open and close the fastener and having guiding walls for said elements, said elements having bodies of thermoplastic material with outer surfaces of the same material facing said guiding walls of the slider, said surfaces having therein recesses extending lengthwise of said bodies and having continuous cylindrical walls, the depth of a recess being at least substantially as great as the expansive distortion of the surface of said recess caused by laundering.

ALFRED BURGENI.